(12) United States Patent
Kiehn et al.

(10) Patent No.: US 11,125,141 B2
(45) Date of Patent: Sep. 21, 2021

(54) METHOD AND SYSTEM FOR AN ENGINE ASSEMBLY

(71) Applicant: Ford Global Technologies, LLC, Dearborn, MI (US)

(72) Inventors: Rainer Kiehn, Frechen (DE); Krystian Dylong, Cologne (DE); Georg Louven, Neuwied (DE); Christoph Niederhut, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/798,144

(22) Filed: Feb. 21, 2020

(65) Prior Publication Data

US 2020/0271044 A1 Aug. 27, 2020

(30) Foreign Application Priority Data

Feb. 21, 2019 (DE) .......................... 102019202339.8

(51) Int. Cl.
*F01M 13/04* (2006.01)
*F01P 5/12* (2006.01)
*B01D 45/14* (2006.01)
*H02K 49/10* (2006.01)

(52) U.S. Cl.
CPC ................ *F01P 5/12* (2013.01); *B01D 45/14* (2013.01); *F01M 13/04* (2013.01); *H02K 49/102* (2013.01); F01M 2013/0477 (2013.01); F01P 2025/30 (2013.01)

(58) Field of Classification Search
CPC .......... B01D 45/14; B04B 9/02; F01M 13/04; F01M 2013/0422; F01M 2013/0477; F01P 2025/30; F01P 5/12; H02K 49/00; H02K 49/102

USPC ... 123/41.44, 41.47, 572–574, 197.1, 196 R, 123/196 A, 196 CP
See application file for complete search history.

(56) References Cited

U.S. PATENT DOCUMENTS

| 3,762,839 A | 10/1973 | Laing |
| 4,807,495 A * | 2/1989 | Wallace .............. F16H 61/0213 477/906 |
| 7,524,357 B2 | 4/2009 | Daukant |
| 2010/0142962 A1 | 6/2010 | Poistie et al. |
| 2015/0260087 A1* | 9/2015 | Wang ........................ F01C 1/22 123/200 |

(Continued)

FOREIGN PATENT DOCUMENTS

| CN | 208253677 | * 12/2018 |
| DE | 2048286 A1 | 11/1971 |

(Continued)

OTHER PUBLICATIONS

JP 2012-127456, Jul. 2012, Terashima, machine translation.*

*Primary Examiner* — Phutthiwat Wongwian
*Assistant Examiner* — Diem T Tran
(74) *Attorney, Agent, or Firm* — Geoffrey Brumbaugh; McCoy Russell LLP

(57) ABSTRACT

Methods and systems are provided for an internal combustion engine assembly comprising a water pump driven by a crankcase venting system. In one example, a method may include adjusting a transmission ratio of a magnetic transmission in response to a temperature of an engine, wherein the magnetic transmission connects a water pump to a crankcase venting system of the engine.

20 Claims, 2 Drawing Sheets

(56) References Cited

U.S. PATENT DOCUMENTS

2016/0359441 A1    12/2016    Calverley et al.

FOREIGN PATENT DOCUMENTS

| DE | 10128465 A1 | 1/2003 |
| DE | 102013205623 A1 | 10/2013 |
| DE | 202015105904 U1 | 11/2015 |
| DE | 102017218870 A1 | 8/2018 |
| WO | 2010142962 A2 | 12/2010 |

* cited by examiner

METHOD AND SYSTEM FOR AN ENGINE ASSEMBLY

CROSS REFERENCE TO RELATED APPLICATIONS

The present application claims priority to German Application No. 102019202339.8 entitled "METHOD AND SYSTEM FOR AN ENGINE ASSEMBLY", and filed on Feb. 21, 2019. The entire contents of the above-listed application are hereby incorporated by reference for all purposes.

FIELD

The present invention relates to methods and system for an internal combustion engine assembly comprising a water pump driven by a crankcase venting system.

BACKGROUND/SUMMARY

In a crankcase of a combustion engine, crankcase venting gases (blow-by gases) occur, which are discharged from the crankcase via a vent system of the combustion engine and are introduced into an induction tract of the combustion engine, in particular for environmental reasons. A pressure difference between the crankcase and the induction tract can be used for this purpose. The vent system has a vent line from the crankcase to the induction tract, where an oil mist separator is arranged to separate an oil mist contained in the blow-by gases from the blow-by gases. The deposited oil is then returned to the crankcase by the oil mist separator.

DE 101 28 465 A1 discloses an oil separator for crankcase venting of a combustion engine, with a radial feed of blow-by gas and chambers for separating oil and air by rotation. In the oil separator, a conveying means is arranged for conveying the blow-by gas, which has at least a first and second vane wheel. The vane wheels are arranged on a common shaft. The shaft is arranged coaxially to a shaft of a water pump, wherein the two shafts are rotationally fixedly interconnected and are driven by a common drive.

U.S. Pat. No. 7,524,357 B2 discloses an oil mist separator for a gas turbine engine. The oil mist separator has a centrifugal separation stage with a fluid connection to a downstream electrostatic separation stage. The centrifugal separation stage drives an electric generator for driving the electrostatic separation stage.

DE 20 2015 105 904 U1 discloses a pump separator with a separator for separating liquid components from a liquid-solid mixture, a self-priming pump that is designed to convey the liquid-solid mixture into the separator, and a drive shaft, wherein the separator and the pump are driven by the drive shaft.

US 2010/142 962 A2 discloses a magnetic transmission for a vehicle. The magnetic transmission has a first magnet rotor, a second magnet rotor and a rotatable pole shoe element, wherein the rotatable pole shoe element is magnetically coupled to the first magnet rotor and the second magnet rotor. The rotatable pole shoe element works as a control rotor, which is arranged in such a way that in operation a change in the transmission ratio between the magnetic rotors results. The magnetic transmission also has a transmission control means for varying the transmission ratio.

The inventors herein have recognized it is possible provide a combustion engine with a compact and light-weight design by driving a water pump of a cooling circuit of an engine system with an oil mist separator via a magnetic transmission. In one example, the method for the engine may comprise adjusting a transmission ratio of a magnetic transmission in response to a temperature of an engine, wherein the magnetic transmission connects a water pump to a crankcase venting system of the engine. In particular, the magnetic transmission connects the water pump to a shaft of an oil mist separator coupled with an electric drive in the crankcase venting system. In this way, the water pump of a cooling circuit of the engine is powered by the electric drive in the crankcase venting system, and does not require a separate drive. Thus, the engine assembly requires a smaller installation space and lower installation cost, providing a lighter, more compact, and less expensive assembly comparing to conventional internal combustion engines.

In another example, the magnetic transmission can have at least one first magnetic rotor rotationally fixedly connected to the shaft of the oil mist separator with mutually circumferentially offset permanent magnets with alternating polarity, at least one second magnetic rotor rotationally fixedly connected to a rotor of the water pump with mutually circumferentially offset permanent magnets with alternating polarity and at least one rotatably arranged modulator ring arranged radially between the two magnetic rotors. The first magnetic rotor may also be embodied such that the permanent magnets are arranged directly on the shaft of the oil mist separator. By moving the modulator ring, the magnetic flux between the magnetic rotors is varied, which leads to a variation of the transmission ratio of the magnetic transmission. The modulator ring is moved into the magnetic field so that the magnetic field is weakened or moved out of the magnetic field so that the magnetic field is strengthened, so that the rotation speed of the water pump is adjustable. It is true that magnetic losses occur, i.e. heat generation takes place. However, this is no longer harmful, as the water pump can absorb and dissipate this heat due to the circulating coolant. The magnetic field within the electromagnetic transmission is also varied by different currents, so that different speeds are adjustable, wherein even rotational direction changes are possible.

In another example, the electric drive of the oil mist separator rotates the shaft at a constant rotational speed, and the method further comprises adjusting a current supply to the electric drive in response to the transmission ratio of the magnetic transmission.

In another example, the electric drive of the oil mist separator does not rotate the shaft at a constant rotational speed. Further, when the oil mist separator is not operating, such as during DFSO (deceleration fuel shut off), in response to the cooling water temperature above a threshold temperature, the electric drive of the oil mist separator is turned on.

In another example, the water pump may have at least one rotor that is in contact with the cooling water. The water pump may be embodied as a centrifugal pump, for example Preferably, an air gap is provided in each case between the first magnetic rotor and the modulator ring and between the modulator ring and the second magnetic rotor, whereby the magnetic transmission does not generate friction losses. Since the magnetic transmission has no roller bearings, no seals are required.

In another example, the oil mist separator is an electric oil mist centrifugal separator in which the oil contained in the blow-by gas is separated from the blow-by gas by means of centrifugal forces, for which the oil mist separator has the centrifugal separator that rotates in operation. The electric drive of the oil mist separator has an electric motor. The shaft serves as an output shaft of the electric drive. The centrifugal separator may, for example, have multiple separating lamellas radially protruding from the shaft and arranged axially spaced apart from each other.

In another example, the internal combustion engine can be a charged or uncharged petrol engine or diesel engine. The crankcase vent system has at least one blow-by gas feed line from the crankcase of the combustion engine to the oil mist separator, at least one gas discharge line for conducting purified gas from the oil mist separator to an induction manifold of the combustion engine and at least one oil drain pipe from the oil mist separator to the crankcase. The cooling circuit has at least one water supply line from a cooler of the cooling circuit to the water pump, at least one water outlet line from the water pump to the internal combustion engine for cooling the internal combustion engine and at least one water pipe from the combustion engine to the cooler.

In another example, the internal combustion engine has at least one controller connected to the magnetic transmission, which is set up to control the magnetic transmission, i.e. the electromagnetic transmission, in such a way that a transmission ratio of the magnetic transmission is varied depending on a cooling requirement detected by sensor of an internal combustion engine of the combustion engine. According to this, the transmission ratio of the magnetic transmission can be varied to increase the speed of the water pump if a higher cooling requirement of the internal combustion engine is determined. Likewise, the transmission ratio of the magnetic transmission can be varied to reduce the speed of the water pump if a lower cooling requirement of the internal combustion engine is determined. The cooling requirement of the internal combustion engine can be determined by means of the controller based on measuring signals of at least one temperature sensor assigned to the combustion engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
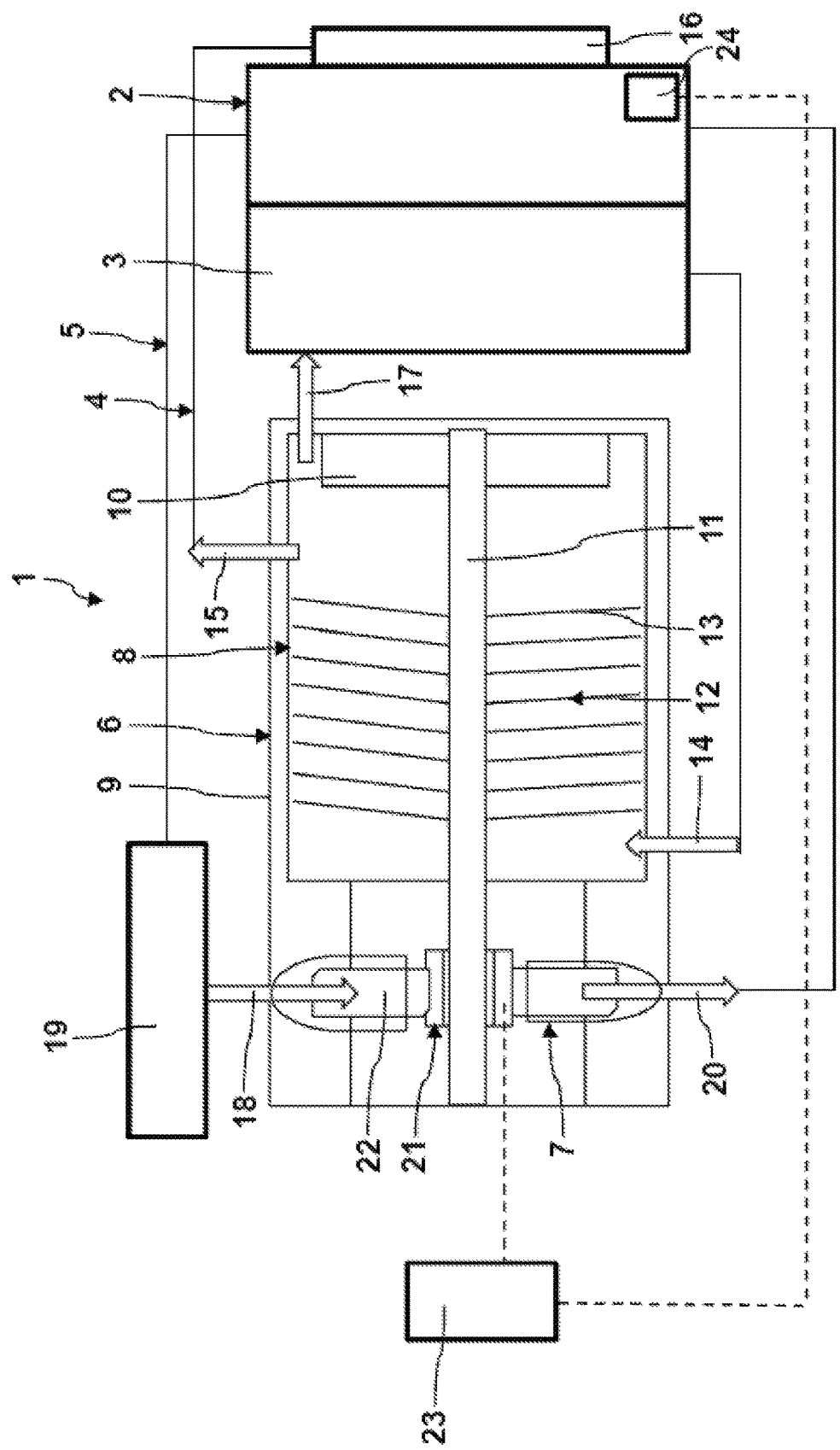
FIG. 1 shows a schematic depiction of an example engine system.
Figure 2:
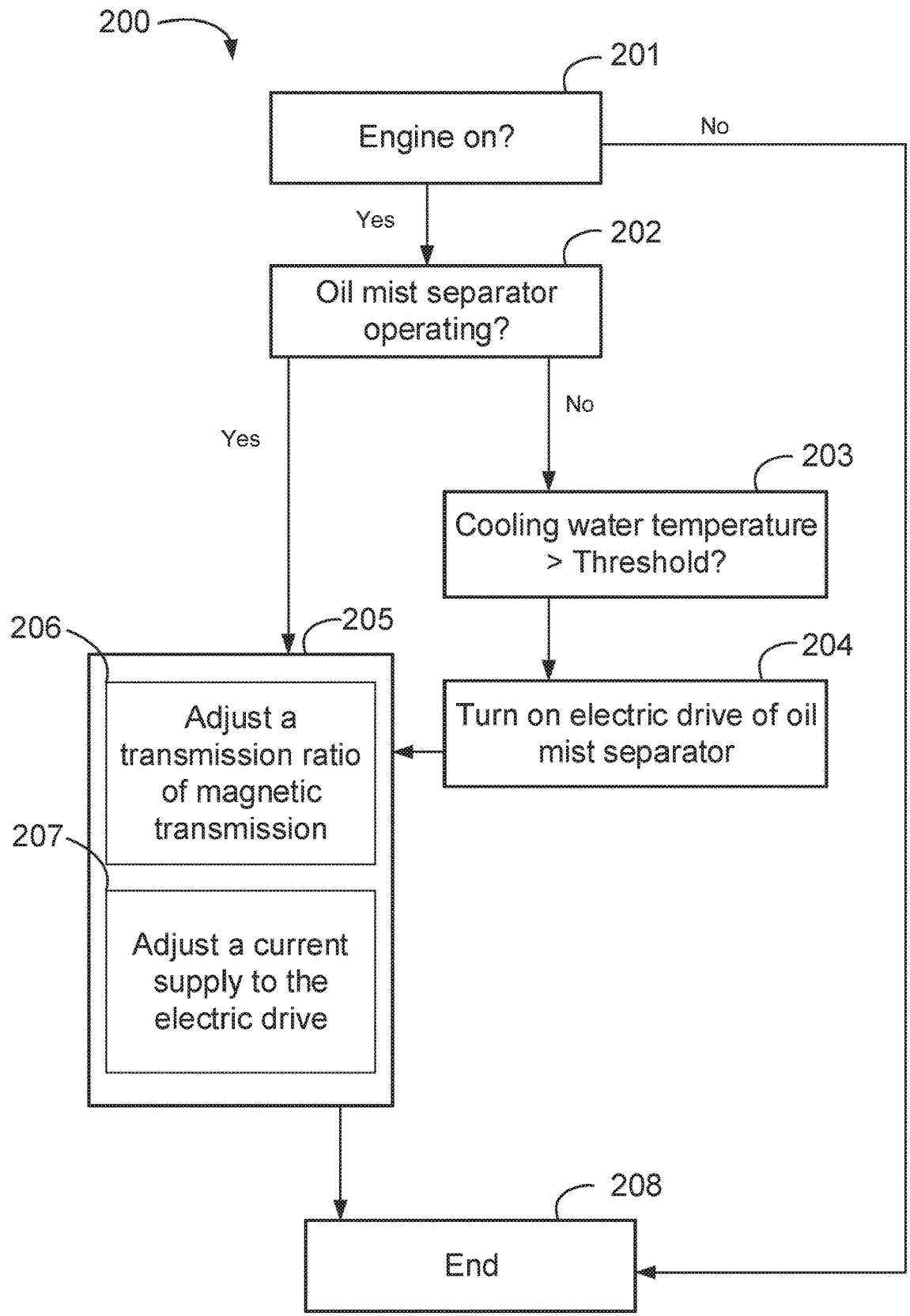
FIG. 2 shows a flow chart of an example method of operating an engine system.

The following description relates to methods for operating an engine assembly. FIG. 1 shows a schematic depiction of an example engine system with a cooling circuit comprising a water pump and a crankcase venting system comprising an oil mist separator. The water pump and the oil mist separator connected by a magnetic transmission. FIG. 2 shows a flow chart of an example method of operating the engine assembly. In response to a cooling water temperature, a transmission ratio of the magnetic transmission is adjusted.

FIG. 1 shows a schematic depiction of an example engine system with a cooling circuit comprising a water pump and a crankcase venting system comprising a oil mist separator. Engine system 1 has an internal combustion engine 2 with a crankcase 3, a crankcase venting system 4 for venting the crankcase 3, and a cooling circuit 5 for cooling the internal combustion engine 2.

In addition, the engine system 1 has an assembly 6, which includes a water pump 7 of the cooling circuit 5 and an oil mist separator 8 of the crankcase venting system 4. The water pump 7 and the oil mist separator 8 are arranged in a common housing 9.

The oil mist separator 8 has an electric drive 10, a shaft 11 that can be driven by the electric drive 10 and a centrifugal separator 12 rotationally fixedly connected to the shaft 11. The centrifugal separator 12 has several separating lamellas 13 that protrude radially from the shaft 11.

The oil mist separator 8 is connected by a blow-by gas supply line 14 to the crankcase 3 and by a gas outlet 15 line to an induction manifold 16 of the combustion engine 1. Furthermore, the oil mist separator 8 is connected to the crankcase 3 via an oil drain pipe 17.

The water pump 7 is connected via a water feed line 18 to a cooler 19 of the combustion engine 1 and via a water outlet line 20 to the internal combustion engine 2.

The assembly 6 also has a magnetic transmission 21 connecting the shaft 11 to the water pump 7 for drive purposes. The magnetic transmission 21 has a first magnet rotor that is not shown that is rotationally fixedly connected to the shaft 11, a second magnet rotor that is not shown that is rotationally fixedly connected to a rotor 22 of the water pump 7 and coaxially arranged relative to the first magnet rotor, and a modulator ring that is not shown that is arranged radially between the magnet rotors and that can be displaced in the circumferential direction for varying the magnetic flux between the magnet rotors. The permanent magnets can also be arranged directly on the shaft 11, thus forming the first magnet rotor.

The internal combustion engine 1 also has controller 23 connected to the magnetic transmission 21 and set up to control the magnetic transmission 21 in such a way that a transmission ratio of the magnetic transmission 21 is varied depending on a cooling demand of the internal combustion engine 2 sensed by a temperature sensor 24 arranged on the internal combustion engine 2. Alternatively, the temperature sensor 24 is arranged in other locations of the cooling circuit 5, such as upstream of the cooler 19.

Turning now to FIG. 2, an example method of operating an engine system is shown in method 200. Instructions for carrying out method 200 and the rest of the methods included herein may be executed by the controller based on instructions stored on a memory of the controller 23 and in conjunction with signals received from sensors of the engine system, such as the temperature sensor 24 described above with reference to FIG. 1.

At 201, method 200 determines whether the engine is operating. If the engine is operating, method 200 moves to step 202. Otherwise, at step 208, method 200 moves to step 208 to exits the routine.

At 202, method 200 determines if the oil mist separator is turned on. As an example, during an engine cold start, the blow-by gas may not contain oil mist due to a lower temperature. Therefore, the oil mist separator is turned off. As another example, after engine warm-up, temperature of the oil in crankcase may be high enough to form oil mist and mix with the blow-by gas. In this case, the oil mist separator is turned on to separate the oil mist contained in the blow-by gas. If the oil mist separator is turned on, method 200 moves to step 205, wherein a transmission ratio of the magnetic transmission and a current supply to the electric drive are adjusted. If the oil mist separator is turned off, method 200 moves to step 203, wherein temperature of cooling water is compared to a threshold temperature.

At step 203, method 200 compares a cooling water temperature and a threshold temperature. The cooling water temperature is determined by a sensed signal from the temperature sensor 24. As described above for FIG. 1, the temperature sensor 24 may be coupled to the internal combustion engine 2. Alternatively, the temperature sensor 24 may be arranged, but not limited to, upstream of the cooler 19 or downstream of the water pump 7. If the cooling water temperature is not above a threshold temperature, method 200 moves to step 208 to exits the routine. If the cooling water temperature is above a threshold temperature, method 200 moves to step 204.

At step 204, method 200 turns on the electric drive of the oil mist separator. By turning on the electric drive of the oil mist separator, the oil mist separator starts operating, and the shaft coupled to the electric drive starts rotating. In one example, the shaft rotates at a constant rotational speed.

At step 205, method 200 adjusts a transmission ratio of the magnetic transmission and a current supply to the electric drive. In particular, at step 206, method 200 adjusts the transmission ratio of the magnetic transmission in response to the cooling water temperature. Specifically, method 200 increases the transmission ratio in response to an increasing cooling water temperature, and decreases the transmission ratio in response to a decreasing cooling water temperature.

Adjustment of the transmission ratio is achieved by moving the modulator ring of the magnetic transmission. For example, when the modulator ring is moved into the magnetic field, the magnetic field is weakened. As a result, the transmission ratio of the magnetic transmission is reduced, and the rotational speed of the water pump is hence reduced. In an another example, when the modulator ring is moved away from the magnetic field, the magnetic field is strengthened. As a result, the transmission ratio of the magnetic transmission is increased, and the rotational speed of the water pump is hence increased.

At step 207, method 200 adjusts a current supply to the electric drive. As described above, the shaft of the oil mist separator rotates at a constant rotational speed. Therefore, as the speed of the water pump increases, more power is transferred from the shaft to the water pump. Consequently, a current supply to the electric drive is increased to maintain the constant rotational speed of the shaft. On the other hand, as the speed of the water pump decreases, the current supply to the electric drive may be decreased due to a lower power command.

The technical effect of coupling a water pump of a cooling circuit of the engine to an oil mist separator of a crankcase venting system may be providing rotational power to the water pump without using an additional motor for the water pump. In this way, the engine assembly requires less space as well as lower cost, and may provide a more compact and cheaper engine assembly.

A method for an engine includes adjusting a transmission ratio of a magnetic transmission in response to a temperature of an engine, wherein the magnetic transmission connects a water pump to a shaft of an oil mist separator of the engine.

A method for an engine further includes in response to a cooling request of an engine, adjusting a magnetic transmission connecting a water pump and a shaft of an oil separator of the engine.

An engine system, comprising a crankcase, a crankcase venting system coupled to the crankcase, an oil mist separator in the crankcase venting system, wherein the oil mist separator includes an electric drive and a shaft driven by the electric drive, a cooling circuit including a water pump, a magnetic transmission coupled to the shaft, the magnetic transmission connecting the shaft to the water pump, and a controller configured with computer readable instructions stored on non-transitory memory for adjusting a transmission ratio of the magnetic transmission in response to a temperature of the engine Note that the example control routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising adjusting a transmission ratio of a magnetic transmission in response to a temperature of an engine, wherein the magnetic transmission connects a water pump to a shaft of an oil mist separator of the engine.

2. The method of claim 1, further comprising coupling the magnetic transmission to the shaft of the oil mist separator of a crankcase venting system.

3. The method of claim 2, further comprising rotationally fixedly connecting a first magnet rotor of the magnetic transmission to the shaft of the oil mist separator of the crankcase venting system.

4. The method of claim 3, further comprising rotationally fixedly connecting a second magnet rotor of the magnetic transmission to a rotor of the water pump, the water pump arranged in a cooling circuit of the engine.

5. The method of claim 4, wherein the first magnet rotor and the second magnet rotor are coaxially arranged.

6. The method of claim 4, further comprising arranging a modulator ring between the first magnet rotor and the second magnet rotor.

7. The method of claim 6, further comprising adjusting the transmission ratio of the magnetic transmission by moving the modulator ring.

8. The method of claim 1, wherein adjusting the transmission ratio of the magnetic transmission includes increasing the transmission ratio in response to an increasing temperature of the engine, and decreasing the transmission ratio in response to a decreasing temperature of the engine.

9. The method of claim 2, further comprising driving the shaft of the oil mist separator by an electric drive.

10. The method of claim 9, further comprising adjusting a current supply to the electric drive in response to adjusting the transmission ratio of the magnetic transmission.

11. A method for an engine, comprising in response to a cooling request of an engine, adjusting a magnetic transmission connecting a water pump and a shaft of an oil separator of the engine.

12. The method of claim 11, wherein adjusting the magnetic transmission includes adjusting a transmission ratio of the magnetic transmission.

13. The method of claim 12, wherein adjusting the transmission ratio of the magnetic transmission includes increasing the transmission ratio in response to an increasing temperature of the engine, and decreasing the transmission ratio in response to a decreasing temperature of the engine.

14. The method of claim 11, further comprising connecting the water pump and the shaft of the oil separator of a crankcase venting system via the magnetic transmission.

15. The method of claim 11, further comprising adjusting a current supply to an electric drive of the shaft.

16. The method of claim 11, wherein adjusting the magnetic transmission includes moving a modulator ring of the magnetic transmission.

17. The method of claim 16, further comprising arranging the modulator ring between a first magnet rotor and a second magnet rotor of the magnetic transmission, the first magnet rotor coupled to a rotor of the water pump and the second magnet rotor coupled to a shaft of an oil separator of the crankcase venting system.

18. An engine system, comprising:
a crankcase;
a crankcase venting system coupled to the crankcase;
an oil mist separator in the crankcase venting system, wherein the oil mist separator includes an electric drive and a shaft driven by the electric drive;
a cooling circuit including a water pump;
a magnetic transmission coupled to the shaft, the magnetic transmission connecting the shaft to the water pump; and
a controller configured with computer readable instructions stored on non-transitory memory for adjusting a transmission ratio of the magnetic transmission in response to a temperature of the engine.

19. The engine system of claim 18, wherein the magnetic transmission comprises a first magnet rotor rotationally fixedly coupled to the shaft and a second magnet rotor rotationally fixedly coupled to the water pump, the first and second magnet rotors arranged coaxially.

20. The engine system of claim 19, further comprising a modulator ring arranged between the first and second magnet rotors.

* * * * *